United States Patent Office 3,298,977
Patented Jan. 17, 1967

3,298,977
SUSPENSION POLYMERIZATION OF LACTAMS USING POLYMERIC MATERIALS AS SUSPENSION AGENTS
James J. Robertson, Franklin Township, Summit County, and Robert A. Hayes, Cuyahoga Falls, Ohio, assignors to The Firestone Tire & Rubber Company, Akron, Ohio, a corporation of Ohio
No Drawing. Filed May 7, 1962, Ser. No. 192,962
16 Claims. (Cl. 260—3)

It is an object of this invention to produce non-aqueous dispersions of polyamides, polyesters and polyethers or interpolymers of these types, and in particular the invention relates to the production of polymeric products as small beads. These beads are sufficiently large to separate as filterable particles, on standing.

Polymers of the type referred to are commercially produced in high-temperature melt systems. It has also been proposed to prepare these polymers in relatively low temperature mass and precipitation polymerization reactions. For the most part, these latter processes do not give polymeric products in finely divided suspensions, and in particular, do not provide polymeric products in the form of small, free-flowing beads. It is frequently desirable to obtain these materials as fine powders in any one of a variety of molecular weights. The preparation of fine powders from the conventional material by grinding is an exceptionally difficult procedure. This invention relates to the preparation of such finely divided material at relatively low temperatures without any necessity of undergoing a grinding process. It will be appreciated, of course, that not all of these polymeric products are hard resinous materials; in fact, some of these can be of a more or less rubbery nature, particularly some of the polyesters and polyethers. However, it is desirable to obtain these materials also in finely divided and/or dispersed form.

When the monomers are such as to yield hard, resinous products, small, substantially spherical, free-flowing beads of polymeric products varying in size from about 10 microns to about 5 millimeters can be obtained by the process of this invention. The size is dependent upon the type and quantity of a polymeric ingredient (hereinafter more fully discussed), temperature, solvent, degree of agitation and nature of the polymeric product involved in the process. In some of its more particular aspects, the invention is concerned with the production of polylactams, especially polycaprolactam. The products obtained from this process, whether as beads, suspensions, dispersions or otherwise, are useful for extrusion and molding by processes which are well known in the art. The very fine beads which are obtained can also be used in fluid-bed type coating processes. Dispersions can be used in coating and like operations. Such processes heretofore have been impractical with polyamides because of the extreme difficulty of obtaining such polymers in a sufficiently finely divided state.

Briefly the invention consists in the polymerization of a suitable monomeric material to form a polymeric product, the polymerization being conducted in an organic medium which is a non-solvent for the polymeric product, in the presence of a small amount of a polymeric suspending ingredient which is dissolved in the organic solvent. The polymeric product is obtained in very finely divided form as suspensions or dispersions of such particles in the organic medium. When the polymeric products are polyamides, and particularly when the polymeric product is a polycaprolactam, free-flowing beads are obtainable.

The polymeric suspending ingredients may be either a polymer or copolymer which is at least partially dissolved in the organic medium at the temperature employed. These include, for example, polymers and copolymers of conjugated dienes which contain 4 to 6 carbon atoms such as polybutadiene-1,3, polypiperylene, polyisoprene, poly(2,3-dimethylbutadiene-1,3) and poly(2 - methylpentadiene-1,3) and copolymers of such dienes with a styrene monomer, e.g. styrene, alpha-methylstyrene, para-methylstyrene, methyl methacrylate, acrylonitrile, vinylidene chloride or other monomer which will give a copolymer that is soluble in the solvent at the temperatures employed. Likewise there may be employed natural high polymers such as Hevea rubber, balata, chilte gum and the like. Polymers or copolymers of olefinic hydrocarbons containing from 2 to 10 carbon atoms and which can be dissolved in the solvent at the temperature employed are also useful. Such polymers include polyisobutylene, polypropylene, polybutene, ethylene-propylene copolymers, isobutylene-isoprene copolymers, isobutylene-styrene copolymers, polyethylene and the like. Small amounts of more polar monomers can be employed as comonomers with the above-mentioned olefins or diolefins providing the resulting polymers are soluble in the solvent at the temperature employed. The polymers named above have the advantage of adequate solubility in inexpensive hydrocarbon solvents. However, if highly aromatic or polar solvents are used, or if temperatures sufficiently high are used to achieve the necessary solution of the polymeric ingredient, many other polymers come into consideration. When the more highly aromatic or polar solvents are used, many other polymers become usable, such as polymers and copolymers of vinyl chloride, vinyl acetate, acrylic and methacrylic esters, such as ethyl acrylate, methyl methacrylate, butyl acrylate, 2-ethylhexyl acrylate, and the like, styrene, alpha methyl styrene, vinyl ethers such as methyl vinyl ether, butyl vinyl ether, methyl isopropenyl ether, acrylonitrile, methacrylonitrile, maleic esters, acrylamide, methyl isopropenyl ketone, and any other vinyl polymer or copolymer, the essential requirement being that solution of the polymeric ingredient in the reaction medium occur at the temperatures employed.

Ordinarily the molecular weight of the polymeric suspending ingredient will be above 1500, as materials of lower molecular weight generally fail to give the desired dispersion. Particle size of the polymeric product will decrease with increasing amounts of the particular polymeric ingredient employed and with the rate and type of agitation. On the basis of weight, generally from 0.01 part to 10 parts, and preferably from 0.05 to 3.0 parts, of polymeric ingredient per hundred parts of monomer will be employed, although occasionally larger or smaller amounts will be desirable. Agitation intensity may vary widely; generally the higher the rate of agitation, the finer will be the particles of polymeric product obtained.

Any organic solvent which is a solvent for the polymeric ingredient but a non-solvent for the polymeric product may be used. From an economic standpoint the aliphatic hydrocarbons are preferred. The choice of aliphatic hydrocarbon will depend upon the temperature at which the polymerization is carried out, and upon the equipment available. Extremely low boiling solvents can be used at temperatures above their boiling point provided satisfactory pressure equipment is available. Aliphatic hydrocarbon solvents include saturated and unsaturated aliphatic and cycloaliphatic hydrocarbons containing, say, from 3 to 30 carbon atoms including, without limitation, hexane, isohexane, neohexane, 2,3-dimethylbutane, heptane, isoheptane, octane, isooctane, nonane, isononane, decane, undecane, dodecane, trimethyldodecane, 1-butene, 2-butene, isobutylene, 1-pentene, 2-pentene, 2- methylbutene-1,3-methylpentene-2, isooctane, cyclohexane, methyl cyclohexane, cyclopentane, decalin and mixtures of any of the foregoing including petroleum ether, mineral oil, kerosene, mineral spirits, etc. Aromatic and partially hydrogenated aromatic hydrocarbons, such as benzene, toluene, the xylenes, naphthalene, durene, mesitylene, chlorobenzene, tertalin, benzotrichloride, diphenylmethane, cumene, cymene, and the like may also be used. More polar solvents may be used such as ketones on the order of acetone and methylethyl ketone, esters such as ethyl acetate, amyl acetate, and tributyl phosphate, ethers such as ethyl ether, butyl ether, dioxan, tetrahydrofuran, and the like. The only limitation with regard to solvent is that it be a non-solvent for the polymeric product and a solvent for the polymeric ingredient and that it does not interfere with the particular catalyst system employed. It is understood that mixtures of these solvents may be used, although the preferred solvents are hydrocarbons. Choice of solvent will be dictated by the economics of the process, and/or ease of removal from the polymeric product.

Any monomers may be used in the process which will polymerize to form polyamides, polyesters or polyethers. These include, for example, the lactams, lactones and cyclic oxides and still more particularly caprolactam are useful in this process. Other monomers that may be used include mixtures of diacyl or diaroyl chlorides with polyamides or polyols, such as terephthaloyl chloride, isophthaloyl chloride, adipoyl chloride, succinyl chloride and phosgene with hexamethylenediamine, metaphenylenediamine, para-phenylenediamine, piperazine, ethylenediamine, diethylene glycol, trimethylol propane, pentaerithoylol, resorcinol, hydroquinone and the like.

This process is applicable to lactams containing from 4 to 10 carbon atoms in the ring, and for various homologues of these materials. Such lactams include pyrrolidone, piperidone, carbon-alkylated pyrrolidone, caprolactam, heptamethyleneimine-2-one and similar materials. Other cyclic monomers capable of use in the process include cyclic hydrocarbon oxides containing 2 to 4 carbon atoms in the ring such as ethylene oxide, propylene oxide, styrene oxide, 1,2-butylene oxide, trioxane and tetrahydrofuran; and lactones of 4 to 10 carbon atoms in the ring, such as caprolactone and butyrolactone.

Polymerization catalysts for these monomers are, of course, well known in the art. Any catalytic system which produces polymers of satisfactory molecular weight at the temperatures employed will be applicable in the system. Lactams, for example, can be polymerized by the addition of water, basic type catalysts or acidic-type catalysts. Basic type catalysts include, for instance, alkali metals, alkaline earth metals and their compounds of sufficient basicity to form a salt with the lactam, and organometallic compounds of the metals of the first three groups of the Periodic Table. Such materials include sodium, potassium, lithium, cesium, calcium, strontium, barium, sodium hydride, sodium hydroxide, sodium carbonate, sodium caprolactam, butylsodium, phenylsodium, lithium hydride, butyllithium, phenyllithium, lithium caprolactam, lithium pyrrolidone, the corresponding potassium compounds, calcium hydride, calcium hydroxide, dibutylcalcium, organometallic compounds such as phenylmagnesium bromide, diethylzinc, diethylaluminum chloride, diethylcadmium and tributylboron. Frequently it is desirable to use an activator system with any of the above basic catalysts. Such activator systems include compounds of the class $$A-\underset{|}{N}-B$$

where N is a tertiary nitrogen compound (i.e. has no hydrogen atoms attached thereto), A is an acyl radical selected from the groups

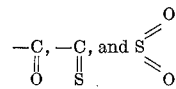

and B is an acyl radical selected from the groups

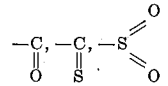

and N=O. Compounds such as isocyanates or isothiocyanates which react in situ to form compounds of the $$A-\underset{|}{N}-B$$

class can also be used. A good description of this general type of polymerization activation is contained in Canadian Patent No. 607,225. In addition, compounds such as titanium tetrachloride, silicon tetrachloride, and mixed alkyl derivatives thereof such as dimethyl dichloro silane serve as activators for base-catalyzed systems. The activators are generally, although not necessarily, used in approximately stoichiometric proportions with the basic catalyst. The molecular weight of the polymeric product varies inversely with the amount of catalyst and of activator; usually from about 0.1 to about 2.0 mol percent of both catalyst and activator will be used, but higher or lower amounts may be used if desirable. Acidic-type materials such as aluminum chloride, titanium tetrachloride, hydrochloric acid and salts of these compounds with weak bases such as cyclohexylamine hydrochloride and aniline hydrochloride also are good catalysts on occasion. The preferred catalyst system for lactam polymerization, and especially for caprolactam, is one involving the above-mentioned basic catalysts with activators such as acetyl caprolactam, isobutyl phthalimide N-methyl diacetamide, alkyl or aryl isocyanates and diisocyanates, such as butyl isocyanate, phenyl isocyanate, tolylene diisocyanate, hexamethylene diisocyanate, and similar compounds.

For polymerizing other monomers than lactams, the catalysts well known in the art and suitable for use in solution polymerization can be used. Some of the catalysts mentioned above would also be suitable for the lactones and cyclic oxides. A wide range of temperatures, etc. may be employed.

Temperatures of polymerization will be in the range well known in the art and will depend on the monomer and catalyst system used. For the activated alkaline catalysts, for instance, the temperature will usually be in the range of 80–200° C., preferably 130–180° C. The process will be carried out in a solvent containing the polymeric ingredient dissolved therein. The monomer and catalyst are either dissolved or dispersed in the solvent, and the mixture agitated under the proper conditions of temperature and pressure. The polymeric product obtained will be in the form of a finely divided suspension or dispersion of the polymeric product in the particular solvent employed. It can be isolated by filtration in the case of suspensions or coagulation if finely divided dispersions are obtained. Occasionally the dispersions as such will be useful for coatings, and similar applications. The granular products isolated, particularly when polyamides such as polycaprolactam are formed, are generally in the form of free-flowing beads which are useful for extrusion, molding, and fluid-bed coating applications. Occasionally it is desirable to produce beads containing sufficient solvent so that expanded products may be prepared directly by methods known in the art.

With the foregoing general discussion in mind, there are given herewith detailed examples of the practice of this invention. All parts and percentages are given by weight, unless the contrary is specifically indicated. Plasticity data was obtained by determining the area in square millimeters (mm.²) of a plaque containing 0.5 gram of polymer, which was prepared by fusion in a Carver Press having 6" x 6" platens heated to a temperature of 250° C. under a total load of 2000 pounds for 30 seconds.

*Example 1*

To a 2-liter round-bottomed flask equipped with a stirrer, nitrogen inlet tube, thermometer, and reflux condenser to the top of which was connected a mercury bubble counter which permitted the maintenance of a slight pressure of nitrogen at all times was charged with 113 g. caprolactam, 0.7 g. sodium caprolactam, 1.6 g. polybutadiene (Mooney viscosity: $ML_4=35$) and 220 g. of an aliphatic hydrocarbon solvent (B.P. 170° C.). The mixture was heated to 110° C. and 2.0 ml. of tolylene diisocyanate was added. The temperature was quickly increased to 160° C. Polymerization began immediately. After 4 hours a suspension of round beads of polycaprolactam about the size of No. 8 shot was obtained. The polymer was removed by filtration, washed well first with methanol, then with water, and dried in an air circulation oven at 65° C. The beads were free flowing and had a very high molecular weight, a plasticity of 2000 mm.$^2$.

*Example 2*

This polymer was prepared identically to that in Example 1 except that 1.0 g. of milled pale crepe rubber was used as a suspending agent instead of polybutadiene. The suspension obtained consisted of very fine beads of polycaprolactam which settled quickly to the bottom of the flask. A total conversion of 99.5 percent was obtained. The polymer had a plasticity of 200 mm.$^2$.

*Example 3*

In the same equipment as described in Example 1 was charged 113 g. caprolactam, 0.7 g. sodium caprolactam, 0.5 g. of milled pale crepe rubber and 250 g. Isopar G (an aliphatic hydrocarbon solvent). The temperature was raised to 120° C. and 1.5 ml. of phenylisocyanate was added. The temperature was raised to 160° C. Polymerization began immediately and was essentially complete in 4 hours. A very fine suspension of small substantialy spherical, free-flowing beads of polycaprolactam was obtained with a conversion of 85 percent. The plasticity was 13,000 mm.$^2$.

*Example 4*

In the same equipment as described in Example 1 was charged 113 g. caprolactam, 0.7 g. sodium caprolactam, 1 g. milled pale crepe rubber and 225 g. Isopar G (an aliphatic hydrocarbon solvent). The mixture was heated to 110° C. and 0.5 milliliter of ethylisocyanate was added. The temperature was raised rapidly to 160° C. The polymerization started immediately, and a suspension of small, substantially spherical, free-flowing beads was obtained. The polymer was isolated by filtration and washed well with methanol. One hundred grams of polycaprolactam which had a plasticity of 9000 mm.$^2$ was obtained. The polymer was extruded into monofilament which after orientation at a 4.8:1 ratio gave a 60-denier monofilament having a tenacity of 5.5 g. per denier.

*Example 5*

The same equipment described in Example 1 was charged with 113 g. caprolactam, 0.7 g. sodium caprolactam, 1.6 g. of a butadiene-styrene copolymer rubber (FRS–181), and 225 g. of an aliphatic hydrocarbon solvent, boiling point 170° C. This mixture was heated to 100° C. and two milliliters of tolylene diisocyanate was added. The reaction was continued overnight at 100° C., after which time the temperature was raised to 160° C. and maintained for two hours. A very fine suspension of small, substantially spherical, free-flowing beads of polycaprolactam was obtained.

*Example 6*

| | | |
|---|---|---|
| Caprolactam | g | 113 |
| Sodium hydride (54.9%, in mineral oil), (0.11 g. as sodium hydride) | g | 0.2 |
| Butyl isocyanate | ml | 1.5 |
| 70/30 ethylene-propylene copolymer rubber (ML–4=44) | g | 2.0 |
| Isopar G (as in Example 3) | g | 340 |

The above ingredients, with the exception of the butyl isocyanate, were charged into the apparatus of Example 1, and the mixture agitated and heated to 100° C. The butyl isocyanate was then added, the temperature was raised to 160° C., and stirring continued for 18 hours. There resulted an excellent suspension of fine, substantially spherical, free-flowing beads of polycaprolactam.

*Example 7*

The procedure of Example 6 was exactly repeated, using unvulcanized butyl rubber in place of the ethylene-propylene copolymer rubber. Again an excellent suspension of fine polycaprolactam beads was obtained.

*Example 8*

The procedure of Example 6 was exactly repeated, using polyisobutylene in place of the ethylene-propylene copolymer rubber. A suspension of fine, free-flowing polycaprolactam beads was obtained.

*Example 9*

| | | |
|---|---|---|
| Caprolactam | g | 113 |
| Sodium hydride (54.9%, in mineral oil), (0.11 g. as sodium hydride) | g | 0.2 |
| N-acetyl caprolactam | cc | 1.0 |
| Completely hydrogenated polybutadiene (90% 1,4) | g | 2.0 |
| Isopar G | g | 340 |

The above ingredients, with the exception of the N-acetyl caprolactam, were charged into the apparatus of Example 1, and the mixture agitated and heated to 145° C. The N-acetyl caprolactam was then added, the temperature was raised to 160° C. and stirring was continued for 1 hour. A suspension of rather large beads of polycaprolactam was obtained.

*Example 10*

| | | |
|---|---|---|
| Caprolactam | g | 113 |
| Sodium hydride preparation (54.9%, in mineral oil), (containing .22 g. of NaH) | g | 0.4 |
| N-acetyl caprolactam | ml | 1 |
| Polystyrene solution in toluene, (containing 2 g. of polystyrene) | ml | 22 |
| Isopar G | g | 340 |

The apparatus of Example 1 was also used in this experiment. The caprolactam was dissolved in the Isopar G and heated to 70° C., at which time the sodium hydride was added. The mixture was stirred and heated to 100° C., and the N-acetyl caprolactam and polystyrene solution were added. The reaction was carried out with heating and stirring at 160° C. for 18 hours. A good suspension of essentially spherical beads was obtained.

What we claim is:
1. The method of polymerizing lactams containing 4 to 10 carbon atoms in the ring, by polymerization in an organic solvent, which method comprises treating said lactam in the presence of a polymeric suspending ingredient with a molecular weight of at least substantially 1500 which is dissolved in the solvent at the temperature at which polymerization of said monomer occurs, allowing substantial polymerization to occur with production of beads each measuring within the range of substantially 10 microns to 5 millimeters in size, the polymeric product being insoluble in the solvent at that temperature.

2. The method of claim 1 in which the monomer is caprolactam.

3. The method of claim 1 in which the polymeric ingredient is selected from the class consisting of homopolymers of a conjugated diene containing 4 to 6 carbon atoms and copolymers thereof with a styrene monomer.

4. The method of claim 1 in which the polymeric ingredient is natural rubber.

5. The method of claim 1 in which the monomer is caprolactam and the polymeric ingredient is natural rubber.

6. The method of claim 1 in which the polymeric ingredient is polybutadiene.

7. The method of claim 1 in which the monomer is caprolactam and the polymeric ingredient is polybutadiene.

8. The method of claim 1 in which the polymeric ingredient is a butadiene-styrene copolymer.

9. The method of claim 1 in which the monomer is caprolactam and the polymeric ingredient is a butadiene-styrene copolymer.

10. The method of claim 1, in which an alkaline-type catalyst is present in the reaction mass.

11. The method of claim 1, in which an alkaline-type catalyst and an activator therefor are present in the reaction mass.

12. The method of claim 1 wherein the polymeric ingredient is an ethylene-propylene copolymer rubber.

13. The method of claim 1 in which the polymeric ingredient is an isobutylene-isoprene copolymer.

14. The method of claim 1 in which the polymeric ingredient is polyisobutylene.

15. The method of producing substantially spherical, free-flowing beads of a lactam polyamide resin each measuring within the range of substantially 10 microns to 5 millimeters in size, which comprises treating the monomeric constituent of said lactam polyamide resin in the presence of a polymeric suspending ingredient with a molecular weight of at least substantially 1500 which is dissolved in a solvent at the temperature at which polymerization of said monomeric constituent of said lactam polyamide resin occurs, allowing substantial polymerization to occur, the lactam polyamide resin being insoluble in said solvent at that temperature.

16. The method of polymerizing caprolactam which comprises dissolving said caprolactam in aliphatic hydrocarbon solvent having dissolved therein a polymeric suspending ingredient with a molecular weight of at least substantially 1500 and a promoted alkaline-type catalyst, and agitating the solution and allowing polymerization to occur at temperatures in the range of 80° C. to 260° C. to produce free-flowing, substantially spherical beads of polycaprolactam each measuring within the range of substantially 10 microns to 5 millimeters in size.

References Cited by the Examiner
UNITED STATES PATENTS

| | | | |
|---|---|---|---|
| 2,302,332 | 11/1942 | Leekley | 260—857 |
| 2,639,278 | 5/1953 | Stott et al. | 260—78 |
| 3,061,592 | 10/1962 | Schnell et al. | 260—78 |
| 3,095,388 | 6/1963 | Osmond et al. | 260—4 |
| 3,143,525 | 8/1964 | Ott | 260—857 |

MURRAY TILMAN, *Primary Examiner.*

LEON J. BERCOVITZ, *Examiner.*

J. W. SANNER, M. J. TULLY, *Assistant Examiners.*